(12) United States Patent
Kim et al.

(10) Patent No.: US 9,857,556 B1
(45) Date of Patent: Jan. 2, 2018

(54) APPARATUS FOR AUTO FOCUS

(71) Applicant: JAHWA electronics Co., Ltd., Chungcheongbuk-do (KR)

(72) Inventors: Hee Seung Kim, Seoul (KR); In Soo Kim, Gyeonggi-do (KR); Masahiro Takashima, Seoul (KR)

(73) Assignee: JAHWA electronics Co., Ltd., Chungcheongbuk-do (KR)

( * ) Notice: Subject to any disclaimer, the term of this patent is extended or adjusted under 35 U.S.C. 154(b) by 0 days.

(21) Appl. No.: 15/401,177

(22) Filed: Jan. 9, 2017

(30) Foreign Application Priority Data

Jun. 9, 2016 (KR) .................... 10-2016-0071581

(51) Int. Cl.
| | |
|---|---|
| *G02B 7/02* | (2006.01) |
| *G02B 7/09* | (2006.01) |
| *G02B 27/64* | (2006.01) |
| *H02K 1/12* | (2006.01) |
| *H02K 1/34* | (2006.01) |
| *H02K 11/215* | (2016.01) |
| *H02K 11/33* | (2016.01) |
| *H02K 33/16* | (2006.01) |

(52) U.S. Cl.
CPC ............. *G02B 7/09* (2013.01); *G02B 27/646* (2013.01); *H02K 1/12* (2013.01); *H02K 1/34* (2013.01); *H02K 11/215* (2016.01); *H02K 11/33* (2016.01); *H02K 33/16* (2013.01)

(58) Field of Classification Search
CPC ... G02B 7/04; G02B 7/00; G02B 7/09; G02B 7/1828; G02B 7/28; G02B 7/282; G02B 21/241; G03B 3/10; G03B 3/00; G03B 2205/0069; G03B 2205/0053; G03B 5/00; G03B 13/36; G03B 13/34
USPC .................................. 359/694–698, 822–824
See application file for complete search history.

(56) References Cited

U.S. PATENT DOCUMENTS

| | | | | |
|---|---|---|---|---|
| 2014/0368937 A1* | 12/2014 | Seol | ......................... | G03B 3/10 359/824 |
| 2015/0323755 A1* | 11/2015 | Kwon | ...................... | G02B 7/04 359/823 |
| 2015/0370033 A1* | 12/2015 | Song | ........................ | H02K 7/00 359/824 |

* cited by examiner

*Primary Examiner* — Mahidere Sahle
(74) *Attorney, Agent, or Firm* — Maier & Maier, PLLC

(57) ABSTRACT

Disclosed is an apparatus for auto focus, which includes a first frame having a magnet, a second frame having an auto focus (AF) coil for moving the first frame in an optical axis direction and a yoke giving an attractive force to the magnet, and a plurality of balls arranged in the optical axis direction and located between the first frame and the second frame so that the first frame and the second frame are maintained to be spaced apart from each other. An entire height of the plurality of balls is equal to or higher than a height of the magnet on the basis of the optical axis direction.

6 Claims, 6 Drawing Sheets

APPARATUS FOR AUTO FOCUS

TECHNICAL FIELD

The present disclosure relates to an apparatus for auto focus, and more particularly, to an apparatus for auto focus having improved tilt performance by using structures and arrangements of a ball and an auto focus (AF) magnet.

BACKGROUND ART

As the hardware technique for image processing is being developed and also the user needs on image photographing is increasing, an auto focus (AF) function and an optical image stabilization (OIS) function are implemented not only at an independent camera but also at a camera module mounted to a mobile terminal such as a cellular phone and a smart phone.

The auto focus function is to adjust a focus distance to a subject by linearly using a lens or a lens assembly in an optical axis direction so that a clear image is generated at an image sensor (CMOS, CCD or the like) provided at a rear end of the lens.

In order to implement the auto focus function, various methods may be used. Representatively, a magnet (a permanent magnet) is installed at an AF carrier (or, a mover), a coil is installed at a stator (or, a housing, or another type of carrier), and a power of a suitable level is applied to the coil to generate an electromagnetic force to the coil (provided at the stator) and the magnet (provided at the mover) to move the mover in an optical axis direction.

In addition, recently, a device, or an actuator, in which the AF and OIS functions are integrated is used. In this case, a structure for moving an OIS carrier (or, a frame, a lens assembly or the like) having a lens loaded thereon in the AF carrier in an X-axis and/or Y-axis direction perpendicular to the optical axis is integrally implemented together with the AF structure described above. In some cases, a lens may be loaded on the AF carrier, and an OIS carrier provided out of the AF carrier may be provided to move in a direction perpendicular to the optical axis direction.

Meanwhile, in an existing device in which only the AF function is provided or the AF and OIS functions are provided together, balls 510-1, 510-2 arranged in the same direction as the optical axis are interposed between an AF carrier 500 (the mover) and a housing 400 (the stator, FIG. 2) in order to improve the behavior characteristics of the AF carrier 500 moving in the optical axis direction, as shown in FIGS. 1 and 2.

In this structure, a suitable distance may be continuously maintained between the mover and the stator, and a frictional force is minimized by means of rotation of the balls and point contacts with the balls, so that the AF carrier may move more smoothly and accurately in the optical axis direction.

In this case, a yoke 420 (FIG. 2) is mounted to the housing 400 (the stator, FIG. 2) to generate an attractive force to a magnet 520 provided at the AF carrier 500 so that the point contact between the AF carrier 500 and the ball 510 may be effectively maintained.

However, in the existing technique, in order to enhance the attractive force between the magnet 520 and the yoke, as shown in FIG. 1 and FIG. 2(a), the magnet 520 generating an attractive force with the yoke is designed as large as possible so that its height D2 is equal to or higher than an entire height D1 of the balls 510 which physically support the AF carrier 500 and the housing.

In this configuration, as shown in FIG. 2(b), if the AF carrier 500 moves downwards based on the optical axis direction by means of AF operation, the magnet 520 loaded on the AF carrier 500 also moves downwards, and thus an attractive force is relatively strongly applied between the magnet 520 and the yoke 420 in a region where the balls do not support, thereby generating a tilt fault θ1 in a horizontal direction.

In another point of view, FIG. 2(c) shows that the AF carrier 500 moves upwards on the basis of the optical axis direction by means of AF operation. In this case, a region where the balls do not support is generated above the magnet 520, and in this region, a detachment may be generated by a predetermined angle θ2 in a lower direction due to the attractive force between the yoke 420 and the magnet 520, thereby causing a tilt fault.

Therefore, in the existing technique, if the AF carrier 500 moves in the optical axis direction, an attractive force is applied between the magnet 520 and the yoke 420 in a region where the balls 510 do not physically support, which may break the balance of the AF carrier 500 and thus resultantly cause tilt faults θ1 and θ2 of the AF carrier 500 as shown in FIG. 2(d).

The tilt faults deform a light path passing to an image sensor 600 through the lens as much as a maximum separation angle (θ=θ1+θ2), thereby causing an error in focusing as much, and thus a problem is caused in generating a clear image.

Recently, a camera module loaded on a smart phone or the like is implemented with a lightweight and slim design. If the camera module has such a slim design, a ratio of width to thickness of the AF carrier increases further, and thus the tilt problem of the AF carrier may become more serious.

DISCLOSURE

Technical Problem

The present disclosure is designed to solve the problems of the related art, and therefore the present disclosure is directed to providing an apparatus for auto focus, which may continuously maintain an AF carrier in a horizontal state and thus ensure better reliability by configuring so that an attractive force generated between a yoke and a magnet is sufficiently supported by balls even though a mover (the AF carrier) moves up and down on the basis of an optical axis direction by means of AF operation.

These and other objects and advantages of the present disclosure may be understood from the following detailed description and will become more fully apparent from the exemplary embodiments of the present disclosure. Also, it will be easily understood that the objects and advantages of the present disclosure may be realized by the means shown in the appended claims and combinations thereof.

Technical Solution

In one aspect of the present disclosure, there is provided an apparatus for auto focus, comprising: a first frame having a magnet; a second frame having an auto focus (AF) coil for moving the first frame in an optical axis direction and a yoke giving an attractive force to the magnet; and a plurality of balls arranged in the optical axis direction and located between the first frame and the second frame so that the first frame and the second frame are maintained to be spaced apart from each other, wherein an entire height of the plurality of balls is equal to or higher than a height of the magnet on the basis of the optical axis direction.

In addition, the plurality of balls may include a first ball group having an n (n is a natural number of 3 or above) number of balls arranged together along the optical axis direction; and a second ball group having a m (m is a natural number of 3 or above) number of balls provided at a location different from the first ball group and arranged together along the optical axis direction, wherein a height of all balls included in the first ball group or the second ball group may be equal to or higher than the height of the magnet on the basis of the optical axis direction.

Further, an uppermost ball which is a ball located at an uppermost location in the first ball group or the second ball group may be provided at a height equal to or higher than a top end of the magnet on the basis of the optical axis direction. In this case, the uppermost ball may have a center point at a height equal to or higher than the top end of the magnet on the basis of the optical axis direction.

More preferably, an outer circumference of a top end of the uppermost ball may be located at a height equal to or higher than the top end of the magnet, which is moved to an uppermost location by means of auto focusing, on the basis of the optical axis direction.

In addition, a lowermost ball which is a ball located at a lowermost position in the first ball group or the second ball group may be provided at a height equal to or lower than a bottom end of the magnet on the basis of the optical axis direction. In this case, the lowermost ball may have a center point at a height equal to or lower than the bottom end of the magnet on the basis of the optical axis direction.

More preferably, an outer circumference of a bottom end of the lowermost ball may be located at a height equal to or lower than the bottom end of the magnet, which is moved to a lowermost location by means of auto focusing, on the basis of the optical axis direction.

Advantageous Effects

According to an embodiment of the present disclosure, even though a frame (or, an AF carrier) for AF moves forward or rearwards in an optical axis direction on the basis of a base frame (a housing, a stator, or the like) by means of AF operation, an entire region where an attractive force is applied between the yoke and the AF magnet is sufficiently supported by balls, and thus it is possible to fundamentally prevent a tilt fault from being generated due to the attractive force between the yoke and the AF magnet.

According to an embodiment of the present disclosure, the AF carrier may be always maintained in a horizontal state even though AF operation is repeatedly performed, and thus it is possible to more precisely control the AF operation and thus ensure better reliability of the auto focus function.

In addition, the present disclosure may be optimally applied to recent products and current technical trends in which more sensitive responses are demanded even to a just tilt change of the AF carrier due to slimmed components and higher-definition pixels.

DESCRIPTION OF DRAWINGS

The accompanying drawings illustrate a preferred embodiment of the present disclosure and together with the foregoing disclosure, serve to provide further understanding of the technical spirit of the present disclosure, and thus, the present disclosure is not construed as being limited to the drawing.

BEST MODE

Hereinafter, preferred embodiments of the present disclosure will be described in detail with reference to the accompanying drawings. Prior to the description, it should be understood that the terms used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation.

Therefore, the description proposed herein is just a preferable example for the purpose of illustrations only, not intended to limit the scope of the disclosure, so it should be understood that other equivalents and modifications could be made thereto without departing from the scope of the disclosure.

Figure 1:
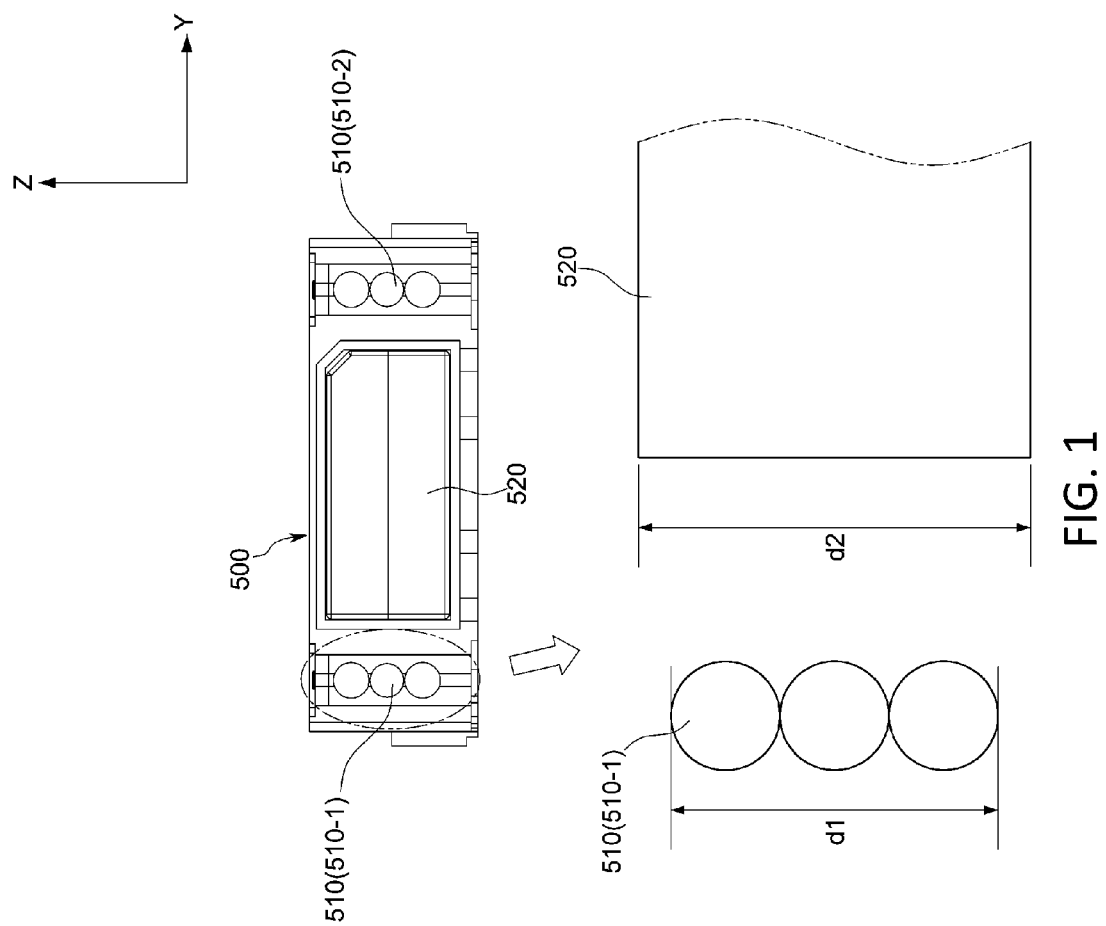
FIG. 1 is a diagram showing an existing structure for AF operation.
Figure 2:
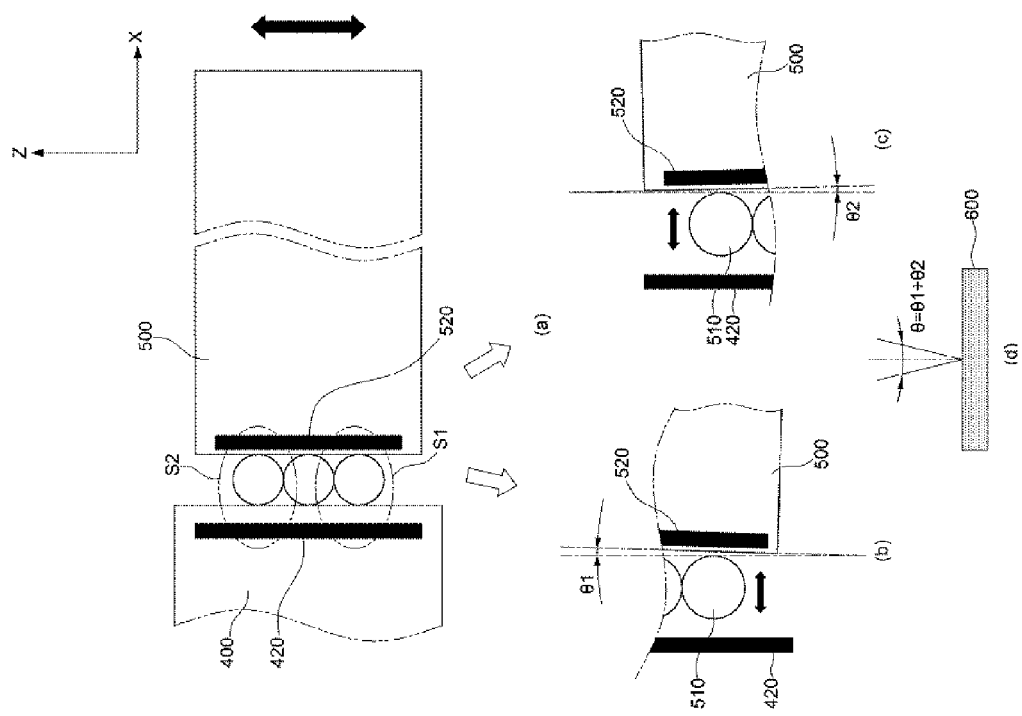
FIG. 2 is a schematic diagram for illustrating a tilt fault generated in the existing AF operation.
Figure 3:
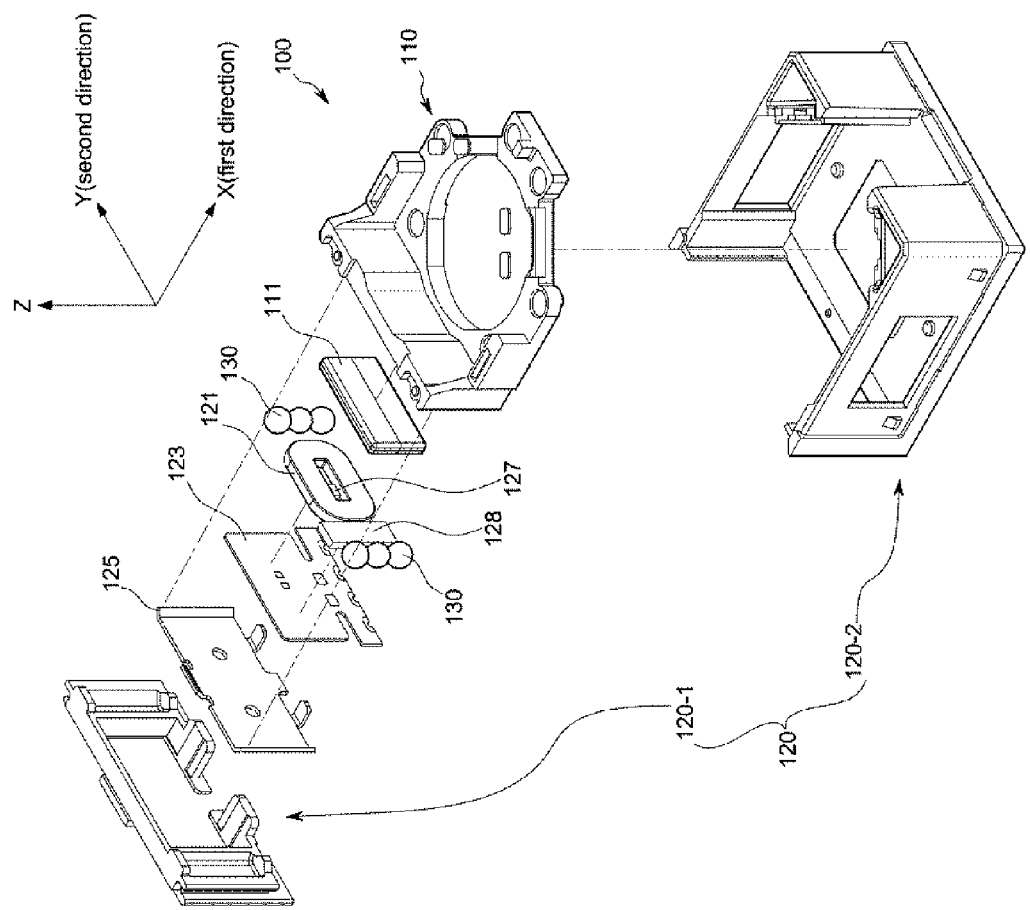
FIG. 3 is an exploded perspective view showing an apparatus for auto focus according to an embodiment of the present disclosure.

FIG. 3 is an exploded perspective view showing an apparatus 100 for auto focus according to an embodiment of the present disclosure.

As shown in FIG. 3, the apparatus 100 for auto focus according to an embodiment of the present disclosure may include a first frame 110, a second frame 120, an auto focus (AF) coil 121, a yoke 125 and a plurality of balls 130.

A magnet 111 for AF operation is provided at the first frame 110, and a back yoke (not shown) for focusing a magnetic force may be further installed at a rear surface of the magnet 111. The first frame 110 is a component serving as a mover in the AF operation and corresponds to the AF carrier described above.

In a device where only the AF function is solely implemented, a lens (not shown) is loaded on the first frame 110 to physically move together with the first frame 110. Thus, if the first frame 110 moves in an optical axis direction, the lens also moves in the optical axis direction (Z-axis direction), and by means of this movement, a distance to an image sensor is adjusted, thereby implementing the auto focus function.

In an embodiment where the AF function and the OIS function are integrated, an optical image stabilization (OIS) frame (a carrier) for OIS operation may be further provided at the first frame 110 for the movement in an X-axis or Y-axis direction perpendicular to the optical axis direction (Z).

In this case, in some embodiments, a lens (or, a lens assembly) is loaded on the OIS frame (not shown). Here, if the first frame 110 moves in the optical axis direction, the OIS frame also moves together in the optical axis direction, and thus the lens also moves in the optical axis direction. If the OIS operation is performed to preventing hand-shaking, the OIS frame moves above the first frame in a direction for compensating for the hand shaking, for example in a direction perpendicular to the optical axis direction.

The apparatus 100 for auto focus according to the present disclosure is designed to effectively solve a tilt problem which occurs during the AF operation and may be applied not only to a device in which the AF function is solely implemented but also to a device in which the AF function and the OIS function are integrally implemented.

The second frame 120 of the present disclosure is a counterpart of the first frame 110, and if the first frame 110 is a mover in the AF operation, the second frame 120 corresponds to a stator in a relatively point of view.

The second frame 120 may include an AF coil 121, a flexible printed circuit board (FPCB) 123, a yoke 125, a hall sensor 127, a drive chip 128 and so on. The AF coil 121 generates an electromagnetic force corresponding to the intensity and direction of power applied from the outside so that the first frame 110 having the magnet 111 moves in the optical axis direction.

The hall sensor 127 senses a location of the magnet 111 (a location of the first frame, namely a location of the lens) by means of a hall effect and transmits a corresponding signal to the drive chip 128 of the present disclosure. The drive chip 128 controls power of suitable intensity and direction to be applied to the AF coil 121 by using the signal input from the hall sensor.

In this way, an accurate location of the lens is fed back on the basis of the optical axis direction, thereby implementing the auto focus function. The AF coil 121, the drive chip 128 and the hall sensor 127 are loaded on the FPCB 123 which is connected to an external module, a power source, an external device or the like.

As shown in FIG. 3, the second frame 120 may be composed of a second sub-frame 120-1 and a second main frame 120-2 or may also be implemented as a single integrated object.

As shown in FIG. 3, the plurality of balls 130 arranged in a direction corresponding to the optical axis direction are located between the first frame 110 and the second frame 120 (the second sub-frame 120-1), and the first frame 110 and the second frame 120 are maintained to be spaced apart from each other as much as a diameter of the balls by means of the plurality of balls 130.

The yoke 125 for generating an attractive force to the magnet 111 provided at the first frame 110 is provided at the second frame 120 in order to maintain a suitable interval between the first frame 110 and the second frame 120 and also continuously maintains point contacts between the first frame 110 and the balls.

In this configuration, the first frame 110 and the second frame 120 are adhered to each other with the balls 130 being interposed therebetween by means of the attractive force applied between the magnet 111 of the first frame 110 and the yoke 125 of the second frame 120, and it may be regarded that the first frame 110 and the second frame 120 are physically supported by the balls 130.

Therefore, the configuration for generating a force to adhere the first frame 110 and the second frame 120 to each other and the configuration for physically making the first frame 110 and the second frame 120 to contact each other are different from each other.

In this configuration, as described above, if the first frame 110 moves up and down by means of AF operation, the attractive force between the magnet 111 and the yoke 125 is generated depending on the location of the first frame 110 in a region where the balls do not support, and due to this phenomenon, a tilt fault is occurred at the first frame 110 which should be maintained in a horizontal state.

Figure 5:
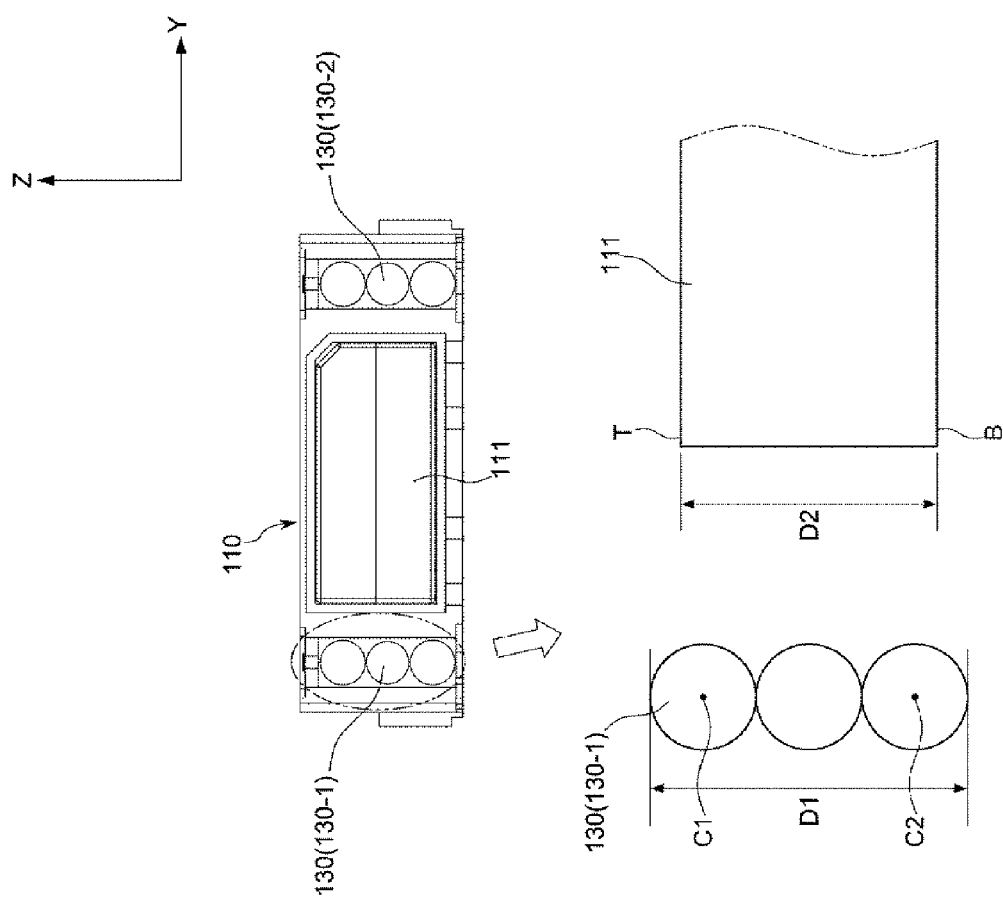
FIG. 5 is a diagram showing configurations of balls and a magnet according to an embodiment of the present disclosure.

The present disclosure is designed from the recognition of this problem to overcome the problem, and as shown in FIG. 5, the plurality of balls 130 are disposed between the first frame 110 and the second frame 120, so that an entire height D1 of the plurality of balls 130 is equal to or higher than a height D2 of the magnet 111 on the basis of the optical axis direction. In other words, the height of the magnet 111 of the present disclosure is not higher than the entire height of the plurality of balls 130.

If the entire height D1 of the balls 130 is equal to or higher than the height D2 of the magnet 111 as described above, the region where an attractive force is applied between the magnet 111 and the yoke 125 is covered by the balls 130 which physically support the first frame 110 and the second frame 120, and thus a tilt fault where the first frame 110 is inclined due to the attractive force between the magnet 111 and the yoke 125 does not occur.

Figure 4:
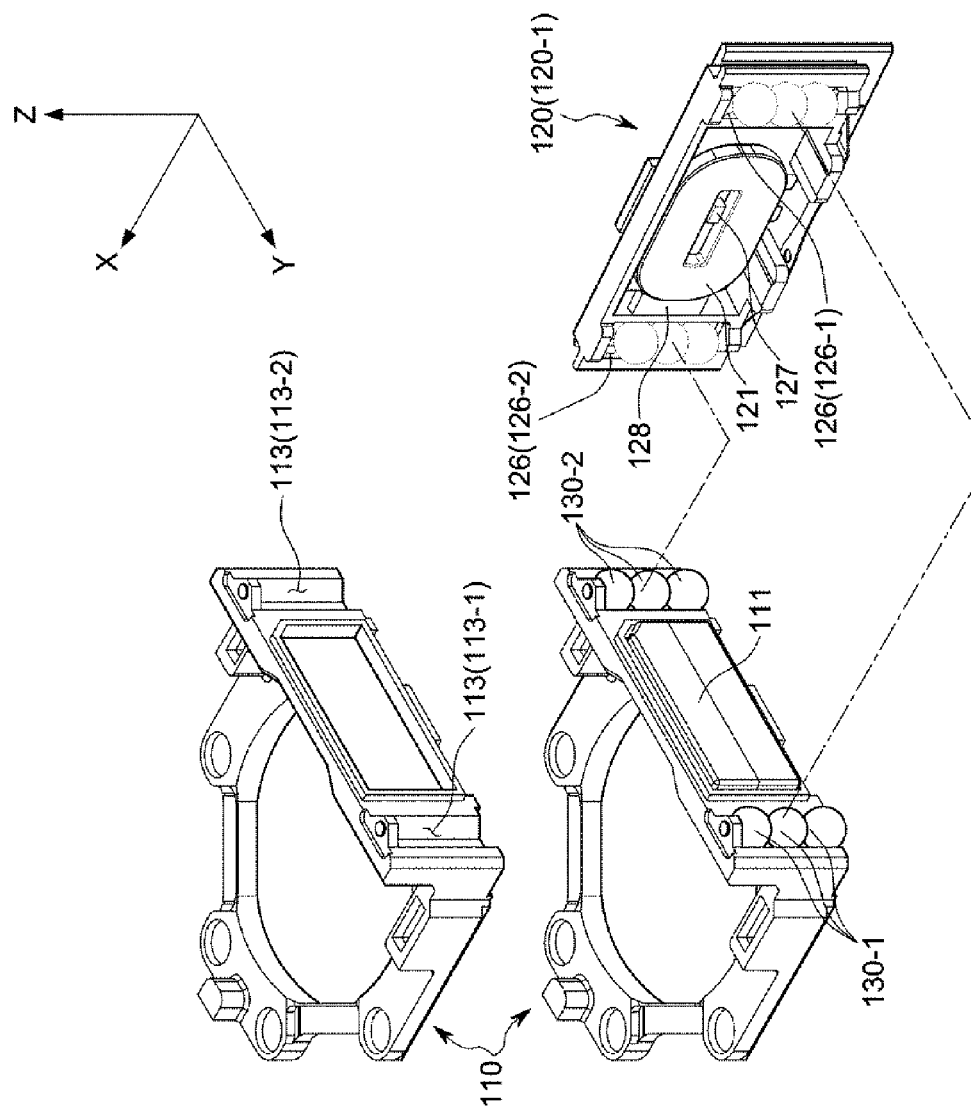
FIG. 4 is a diagram showing detailed configurations of a first frame and a second frame of the present disclosure, depicted in FIG. 3.

FIG. 4 is a diagram showing detailed configurations of the first frame 110 and the second frame 120 of the present disclosure.

Since the first frame 110 of the present disclosure moves forwards and rearwards along the optical axis direction as described above, the plurality of balls 130 of the present disclosure may be arranged along the optical axis direction (the Z-axis direction) as shown in FIGS. 3 and 4 in order to effectively guide the movement in the optical axis direction.

Further, in order to physically support the first frame 110 more stably by means of the point contacts, the plurality of balls 130 may be classified into a first ball group 130-1 having an n number of balls arranged together along the optical axis direction and a second ball group 130-2 having a m number of balls provided at a location different from the first ball group 130-1 and arranged together along the optical axis direction. Here, n and m are natural numbers of 3 or above, and n and m may be identical to or different from each other.

In this configuration, all balls included in the first ball group 130-1 or the second ball group 130-2 are configured to have a height equal to or higher than the height of the magnet 111 on the basis of the optical axis direction.

In addition, a guide groove 113 extending along the optical axis direction may be provided at the first frame 110 to prevent the plurality of balls 130 from being deviated outwards and guide the first frame 110 more effectively, and the guide groove 113 may include a first guide groove 113-1 located at a left side and a second guide groove 113-2 located at a right side based on FIG. 4, as in the embodiment depicted in FIG. 4.

An accommodation groove 126 is provided at the second frame 120 to correspond to the structure of the guide groove 113 of the first frame 110. Here, the accommodation groove 126 may include a first accommodation groove 126-1 corresponding to the first guide groove 113-1 of the first frame 110 and a second accommodation groove 126-2 corresponding to the second guide groove 113-2 of the first frame 110, namely disposed at a location to face the second guide groove 113-2.

In this case, the first ball group 131-1 described above may be provided to be partially accommodated between the first guide groove 113-1 and the first accommodation groove 126-1, and the second ball group 131-2 may be provided to be partially accommodated between the second guide groove 113-2 and the second accommodation groove 126-2.

Any one of the first guide groove 113-1 and the second guide groove 113-2 may have a sectional shape of "V", and the other guide groove may have a sectional shape of "U". If both guide grooves have different shapes as above, contact portions with the balls and rotation characteristics may be differently configured, which may further improve the operation of the first frame 110 moving in the optical axis direction.

As described above, the plurality of balls 130 according to the present disclosure may be classified into the first ball group 130-1 and the second ball group 130-2. In this case, a ball located at an uppermost location in the first ball group 130-1 or the second ball group 130-2 may be provided at a height equal to or higher than a top end of the magnet 111 on the basis of the optical axis direction.

In the following description, a ball located at an uppermost location in each of the first ball group 130-1 and the second ball group 130-2 is called an uppermost ball, and relatively, a ball located at a lowermost position in each of the first ball group 130-1 and the second ball group 130-2 is called a lowermost ball.

If the uppermost ball is located at a height equal to or higher than the top end of the magnet 111 as described above, the entire region where the attractive force is generated between the magnet 111 and the yoke 125, particularly the top region, may be physically supported by the balls 130.

In order to physically support the first frame 110 and the second frame 120 more effectively by means of the balls 130, as shown in FIG. 5, the uppermost ball may be provided to have a center point C1 at a height equal to or higher than a top end T on the basis of the optical axis direction.

Similar to the uppermost ball described above, among the plurality of balls 130 according to the present disclosure, the lowermost ball may be provided at a height equal to or lower than a bottom end of the magnet 111 on the basis of the optical axis direction, and in order to physically support more effectively, as shown in FIG. 5, the lowermost ball may have a center point C2 at a height equal to or lower than the bottom end B of the magnet 111 on the basis of the optical axis direction. In this case, the entire height D1 of the balls 130 may also be equal to or higher than the height D1 of the magnet 111.

Figure 6:
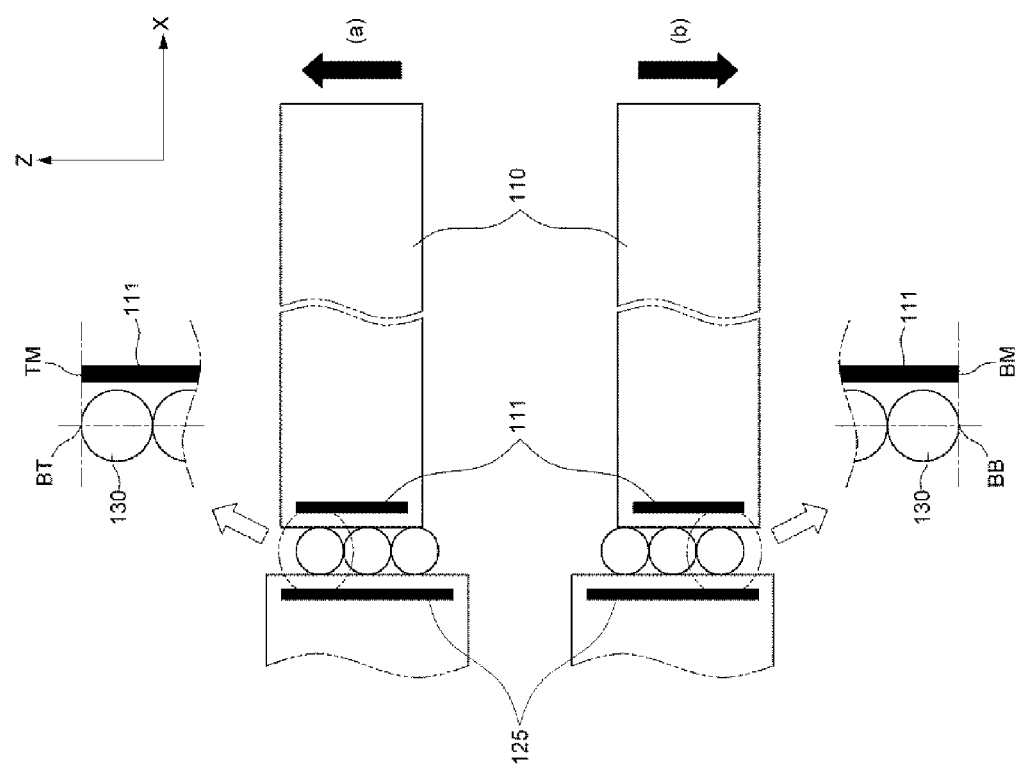
FIG. 6 is a diagram showing that a tilt fault is prevented during AF operation according to an embodiment of the present disclosure.

FIG. 6(*a*) shows that the first frame 110, namely the magnet 111, moves to an uppermost position based on the optical axis by means of AF operation, and FIG. 6(*b*) shows that the first frame 110, namely the magnet 111, moves to a lowermost position based on the optical axis by means of AF operation.

If the magnet 111 is greater than the region (height) where the balls 130 physically support, a tilt fault may occur at the first frame 110 due to the attractive force between the magnet 111 and the yoke 125, as described above. This phenomenon becomes gradually severe when the first frame 110 moves in both directions along the optical axis by means of AF operation, and when the first frame 110 moves to the maximum in both directions, a maximum tilt fault may be generated.

In order to solve this problem, as shown in FIG. 6(*a*), the uppermost ball 130 according to the present disclosure may be configured so that an outer circumference BT (FIG. 6(*a*)) if its top end is located at a height equal to or higher than the top end of the magnet 111 when the first frame 110, namely the magnet 111, moves to the uppermost location on the basis of the optical axis direction by means of AF operation.

In addition, as shown in FIG. 6(*b*), the lowermost ball 130 according to the present disclosure may be configured so that an outer circumference BB (FIG. 6(*b*)) of its bottom end is located at a height equal to or lower than the bottom end of the magnet 111 when the magnet 111 moves to the lowermost location on the basis of the optical axis direction by means of AF operation.

In this configuration, even though the magnet 111 moves up or down (forwards or rearwards) in the optical axis direction within a maximum range by means of AF operation, the entire where an attractive force is applied between the magnet 111 and the yoke 125 is supported by the balls 130. Thus, it is possible to more effectively prevent a tilt fault which becomes severe due to the attractive force between the magnet 111 and the yoke 125.

The present disclosure has been described in detail. However, it should be understood that the detailed description and specific examples, while indicating preferred embodiments of the disclosure, are given by way of illustration only, since various changes and modifications within the scope of the disclosure will become apparent to those skilled in the art from this detailed description.

In the present disclosure, the terms such as "first" and "second" are just used for distinguishing components from each other and should not be interpreted as indicating special orders, priorities or the like.

The drawings for illustrating the present disclosure may be somewhat exaggerated to emphasize or highlight features of the present disclosure, but it should be understood that various modifications can be made in the level of those skilled in the art in consideration of the above disclosure and the drawings.

REFERENCE SYMBOLS

| | |
|---|---|
| 100: apparatus for auto focus | |
| 110: first frame | 111: magnet |
| 120: second frame | 121: coil |
| 123: FPCB | 125: yoke |
| 127: hall sensor | 128: drive chip |
| 130: ball | 130-1: first ball group |
| 130-2: second ball group | |

What is claimed is:

1. An apparatus for auto focus, comprising:

a first frame having a magnet;

a second frame having an auto focus (AF) coil for moving the first frame in an optical axis direction and a yoke being provided at a back of the auto focus coil and giving an attractive force to the magnet; and a plurality of balls arranged in the optical axis direction and located between the first frame and the second frame so that the first frame and the second frame are maintained to be spaced apart from each other, wherein an entire height of the plurality of balls is equal to or higher than a height of the magnet on the basis of the optical axis direction and an entire height of the yoke is equal to or higher than the entire height of the plurality of balls, and a side of the first frame where the magnet is provided and a side of the second frame where the auto focus coil is provided face each other, and the plurality of balls are positioned between the side of the first frame where the magnet is provided and the side of the second frame where the AF coil and the yoke are provided, wherein an outer circumference of a top end of an uppermost ball is located at a height equal to or higher than the top end of the magnet, which is moved to an uppermost location by means of auto focusing, and wherein an outer circumference of a bottom end of a lowermost ball is located at a height equal to or lower than the bottom end of the magnet, which is moved to a lowermost location by means of auto focusing, on the basis of the optical axis direction.

2. The apparatus for auto focus according to claim 1, wherein the plurality of balls includes:
   a first ball group having an n (n is a natural number of 3 or above) number of balls arranged together along the optical axis direction; and
   a second ball group having an m (m is a natural number of 3 or above) number of balls provided at a location different from the first ball group and arranged together along the optical axis direction,
   wherein a height of all balls included in the first ball group or the second ball group is equal to or higher than the height of the magnet on the basis of the optical axis direction.

3. The apparatus for auto focus according to claim 2, wherein the uppermost ball which is a ball located at an uppermost location in the first ball group or the second ball group is provided at a height equal to or higher than a top end of the magnet on the basis of the optical axis direction.

4. The apparatus for auto focus according to claim 3, wherein the uppermost ball has a center point at a height equal to or higher than the top end of the magnet on the basis of the optical axis direction.

5. The apparatus for auto focus according to claim 2, wherein the lowermost ball which is a ball located at a lowermost position in the first ball group or the second ball group is provided at a height equal to or lower than a bottom end of the magnet on the basis of the optical axis direction.

6. The apparatus for auto focus according to claim 5, wherein the lowermost ball has a center point at a height equal to or lower than the bottom end of the magnet on the basis of the optical axis direction.

* * * * *